United States Patent Office 3,534,078
Patented Oct. 13, 1970

3,534,078
ONIUM AMALGAMS
Brian John Woodhall and John David Littlehailes, Runcorn, England, assignors to Imperial Chemical Industries Limited, London, England, a corporation of Great Britain
No Drawing. Filed Jan. 26, 1968, Ser. No. 700,720
Claims priority, application Great Britain, Feb. 7, 1967, 5,842/67; Mar. 28, 1967, 14,098/67; Apr. 17, 1967, 17,529/67
Int. Cl. C07f $3/10, 3/12$
U.S. Cl. 260—431
18 Claims

ABSTRACT OF THE DISCLOSURE

Amalgams of onium radicals represented by the general formula $R_nM/Hg$. Preferably, the onium radicals $R_nM$ are quaternary ammonium ($R_4N$), quaternary phosphonium ($R_4P$) or ternary sulphonium ($R_3S$). These amalgams are prepared by reducing a solution of an onium salt at a mercury surface in a substantially inert, polar, aprotic medium. These amalgams are useful as reducing agents.

---

This invention relates to amalgams of certain organic cations known as "onium" ions, and to their preparation.

"Onium" cations form ionic, salt-like compounds with anions, the cation being a co-ordination complex of a non-metallic element. "Onium" salts may be represented by the general formula $(R_nM)^+X^-$ where R is an organic group, $X^-$ is an anion of any acid capable of salt formation and M represents the non-metallic element on which the "onium" ion is based, and is, especially, nitrogen ($n=4$) phosphorus ($n=4$) or sulphur ($n=3$).

The "onium" radical may therefore be represented by the general formula $R_nM$.

The present invention provides amalgams of "onium" radicals, which may be represented by the general formula $R_nM/Hg$. Preferably; the radicals are quaternary ammonium ($R_4N$) quaternary phosphonium ($R_4P$) or ternary sulphonium ($R_3S$).

"Onium" amalgams behave and analyse as though they consist of an "alloy" of mercury and the "onium" radical ($R_nM$) and are powerful reducing agents.

A process for preparing "onium" amalgams comprises reducing a solution of an "onium" salt at a mercury surface in a substantially inert, polar, aprotic medium. Preferably, the process is carried out eithe (a) by electrolysis at a mercury cathode or (b) by reaction with an alkali metal amalgam.

The preferred alkali metal amalgams are sodium and potassium amalgams, though such a preference is based only on economic considerations.

It is desirable that the reaction medium is substantially free of reducible components which could be discharged at the cathode or react with either the alkali metal or "onium" amalgam. The contaminant most likely to be present is water, but other proton sources and metal ions may also be present. When it is desired to isolate the "onium" amalgam the concentration of other proton sources and metal ions should be maintained as low as possible. If the "onium" amalgam is to be used in situ as a reagent, for example, to reduce an organic substrate, water may be present. It is advantageous to dry commercial grades of polar aprotic solvents by passing through a molecular sieve or by distilling from a drying agent, such as calcium hydride. Suitable polar aprotic solvents are acetonitrile, dimethylformamide, hexamethylphosphoramide, N-methylpyrollidone and dimethyl sulphoxide.

The nature of the anion associated with the "onium" cation is not of special importance and salts will generally be chosen on such considerations as availability, ease of manufacture, solubility in the chosen solvents, and corrosion effects on the apparatus. However, in the case of the reaction involving alkali metals, since the electrochemical potential promoting the reaction is essentially fixed, the reaction is an equilibrium and is therefore reversible. The forward reaction to "onium" amalgam is not inherently favoured, and so the anion should be such that the alkali metal salt formed is substantially insoluble in the reaction medium, thereby influencing the course of the reaction in the desired direction.

Anions which may be incorporated in the "onium" salts include paratoluene sulphonate, tetrafluoroborate, chloride, bromide, iodide and bicarbonate.

It is preferred that the organic radicals of the "onium" salt and hence also of the "onium" amalgam are aliphatic. Aromatic "onium" amalgams are rather unstable. Alkyl radicals, especially unbranched alkyl radicals, are most readily incorporated in the product amalgams and two or more such radicals may be linked to form a heterocyclic ring structure. For example two of the four alkyl radicals of a quaternary ammonium amalgam may be linked to form a nitrogen-containing heterocyclic system.

"Onium" amalgams may be prepared from salts containing any one of the following cations: tetramethyl ammonium, trimethyl ethyl ammonium, dimethyldiethyl ammonium, tetraethyl ammonium, tetra-n-butyl ammonium, tetra-n-propyl ammonium, triethylmethyl ammonium, dodecyltrimethyl ammonium, cetyl trimethyl ammonium, tetramethyl-phosphonium, tetra-n-butyl phosphonium, trimethyl sulphonium, triethyl sulphonium, tri-n-propyl sulphonium, tri-n-butyl sulphonium and triphenyl sulphonium.

Furthermore "onium" amalgams may be prepared from "onium" salts having two or more atoms of the non-metallic element linked by a difunctional hydrocarbon group or groups, especially a poly(methylene) chain. An example of such an "onium" salt is tetramethylene bis-(tri-n-butyl-phosphonium iodide).

Those amalgams formed from "onium" cations in which all the substituents are methyl groups are generally the most stable.

The reactions are preferably carried out in the absence of air, and at low temperatures, preferably between $-30°$ C. and $+10°$ C. Phosphonium and sulphonium amalgams should be prepared below 0° C.

When the process is carried out by the electrolytic method, it is convenient to use a cell having a porous partition separating the anode compartment from the cathode compartment. The partition may be constructed of sintered glass. The nature of anode material is unimportant, provided that it is inert; platinum is therefore very suitable. Current densities in the range 0.5–100 milliamps per square centimetre are convenient to use.

When the process is carried out by the amalgam method, it is not necessary to maintain the relative proportions of alkali metal amalgam and "onium" salt within closely defined limits. It is convenient to use moderate excess of alkali metal amalgams, although even where the "onium" amalgam forms a distinct phase, some contamination with alkali metal is likely. In most uses, such contamination is not particularly disadvantageous, though it does indicate that to prepare a pure "onium" amalgam, the electrolytic route is to be preferred.

Tetramethyl ammonium amalgam is a grey crystalline solid giving an X-ray powder photograph similar to solid crystalline mercury, but with a distorted lattice. Tetramethyl, dimethyldiethyl, methyltriethyl, tetra - n-propyl and tetra-n-butyl quaternary ammonium amalgams are also all grey solids. They float on the surface of mercury and the tetramethyl ammonium amalgam, at least, is moderately stable in the absence of air and water.

The potentials of some of these amalgams were measured with reference to a saturated calomel electrode by a digital voltmeter. The following results were obtained.

| Amalgam: | Potential (volts) |
|---|---|
| $(CH_3)_4N/Hg$ | −2.6 |
| $(CH_3 \cdot CH_2)_4N/Hg$ | −2.8 |
| $(CH_3(CH_2)_2)_4N/Hg$ | −2.9 |
| $(CH_3(CH_2)_3)_4N/Hg$ | −3.0 |

Amalgams prepared from cetyltrimethyl-, ethyltrimethyl-, dodecyltrimethyl-, phenyltrimethyl- and benzyltrimethyl- quaternary ammonium compounds are soluble in mercury, but they may be identified by potential measurements.

Phosphonium amalgams are generally black amorphous powders which float on the surface of mercury.

They are less stable than equivalent nitrogen containing compounds, and should be stored at temperatures below −30° C.

Sulphonium amalgams are generally soluble in mercury.

"Onium" amalgams may be analyzed by acid hydrolysis, followed by conventional analytical methods to identify the "onium" salt which is formed.

Oxonium amalgams have not been successfully prepared by methods according to the present invention. Presumably they are too unstable to allow identification.

As mentioned above, "onium" amalgams are powerful reducing agents, especially for organic substrates and may be used in situ or may be removed from the apparatus in which they are prepared. Thus alkyl halides are readily reduced, with the formation of mercury dialkyls. A further use is in the reductive dimerisation (hydrodimerisation) of acrylonitrile to adiponitrile. This process is described in detail in our co-pending British patent application No. 5,842/67, but briefly, it comprises contacting the amalgam with a homogeneous reaction medium composed of acrylonitrile and a proton source such as water or a lower alcohol, and an additional polar organic solvent. The "onium" amalgam may be used in admixture with, say, sodium amalgam, if desired.

The preparation of "onium" amalgams will now be illustrated by the following examples.

EXAMPLE 1

15 mls. of a saturated solution of recrystallised dry tetramethyl ammonium chloride in anhydrous acetonitrile, the acetonitrile having been dried by treatment with an aluminium calcium silicate molecular sieve (BDH type 5A) was electrolysed at 0° C. in a divided cell for 40 mins. at a current of 7–10 ma. using a mercury cathode and a platinum anode. The solution was deoxygenated and stirred using dry nitrogen and a glass frit was used as the divider. The tetramethyl ammonium amalgam thus produced in the cathode compartment was run off, and washed with sold dry acetonitrile.

EXAMPLE 2

15 mls. of a 0.1 M solution of dry tetra-n-butyl ammonium iodide in anhydrous dimethyl formamide (dried by distillation from calcium hydride under reduced pressure) was electrolysed for 60 mins. at a current of 10–12 ma. at 10° C. in a cell of the same construction as that used in Example 1. The resulting tetra-n-butyl ammonium amalgam was washed with dry dimethylformamide, followed by dry acetonitrile.

EXAMPLE 3

Tetramethyl ammonium amalgam was prepared in anhydrous dimethylformamide in a manner similar to Example 2 except that a 0.1 M solution of tetraethyl ammonium iodide was used.

EXAMPLE 4

A solution of tetramethyl ammonium borofluoride in anhydrous acetonitrile (15 mls., 0.01 M), dried by treatment with an aluminium calcium silicate molecular sieve (BDH type 5A) was electrolysed at a temperature of 0° C. for a period of 2 hours at a current density of 20 ma./sq. cm., using a cell divided by a glass frit and fitted with a mercury cathode and a platinum anode. Oxygen-free nitrogen was used to de-aerate the solution. Tetramethyl-ammonium amalgam was produced in the cathode compartment at 95% current efficiency as grey crystals on the mercury surface. On stirring the surface, the crystals dissolved in the mercury.

EXAMPLE 5

The procedure of Example 4 was repeated using a solution of tetraethyl ammonium iodide in anhydrous acetonitrile (0.1 M). Tetraethyl ammonium amalgam was formed as a grey, fluffy material on top of the mercury cathode, and was insoluble in mercury. The mercury was decanted off, and the amalgam was washed with cold acetonitrile or ether under anhydrous and air-free conditions to remove unreacted tetraethyl ammonium iodide.

EXAMPLE 6

A solution of tetra-n-butylammonium iodide in anhydrous dimethylformamide (0.1 M), dried by distillation from calcium hydride under reduced pressure, was electrolysed at a mercury cathode in a divided cell at a temperature of −20° C. in the absence of air, using a current of 25 ma. Tetra-n-butylammonium amalgam was formed with a current efficiency of 70%. The amalgam floated on the mercury as a fluffy, grey solid which could be separated off and washed as in Example 2.

EXAMPLE 7

A solution of triethylmethyl ammonium chloride in anhydrous hexamethylphosphoramide (0.5 M), dried by treatment with a molecular sieve, was electrolysed at a temperature of −10° C. at a mercury cathode in the absence of air, using a current density of 50 ma./sq. cm. Triethylmethyl ammonium amalgam was obtained at a current efficiency of 80%. The amalgam floated on the mercury surface and was separated and washed as in Example 2.

EXAMPLE 8

A solution of cetyltrimethyl ammonium bromide in anhydrous dimethylformamide (0.1 M), dried by distillation from calcium hydride under reduced pressure, was electrolysed at a mercury cathode at a temperature of −25° C., using nitrogen to de-aerate the solution. A voltage of 20 v. gave a current density of 20 ma./sq. cm., and the cetyltrimethyl ammonium amalgam formed, which was miscible with mercury, was produced at a current efficiency of 60%.

EXAMPLE 9

A solution of tetramethyl ammonium borofluoride in N-methylpyrollidone (0.01 M) (laboratory reagent grade) was electrolysed at a temperature of 0° C. for a period of 2 hours at a current density of 20 ma./sq. cm., using a cell divided by a glass frit and fitted with a mercury cathode and a platinum anode. Oxygen-free nitrogen was used to de-aerate the solution. Tetramethylammonium amalgam was formed in the cathode compartment at a current efficiency of 20%.

In all the above examples, the presence of quaternary ammonium amalgams was shown by measuring the potential against a saturated calomel electrode, or by reacting the amalgam with water or an acid, observing the evolution of hydrogen, and demonstrating the presence in the reaction vessel of the appropriate quaternary ammonium salt or hydroxide by conventional means.

EXAMPLE 10

Tetramethyl ammonium tetrafluoroborate (1.36 g., $8.45 \times 10^{-3}$ moles) was dissolved in anhydrous, redistilled acetonitrile (20 g.), which had been dried by treatment with a molecular sieve, followed by distillation from calcium hydride.

Sodium amalgam (250 g., 0.422% Na wt./wt.) was stirred under this solution in an atmosphere of nitrogen, at a temperature of $-15°$ C.

Aliquots were removed from the mercury layer at intervals, and a steady increase in the concentration of tetramethyl ammonium amalgam in the mercury was detected. After 26 hours, the amount of tetramethyl ammonium amalgam dissolved in the mercury was $1.56 \times 10^{-3}$ moles.

Analysis of the amalgam was by reaction of the aliquots with water, followed by determination of liberated tetramethyl ammonium cation with Reinecke salt.

EXAMPLE 11

Example 10 was repeated using trimethylethyl ammonium iodide ($8.45 \times 10^{-3}$ moles).

After 24 hours, trimethylethyl ammonium amalgam ($1.34 \times 10^{-3}$ moles) had formed as a solid layer above the mercury.

Analysis of the product amalgam was by reaction with water and measurement of the amount of hydrogen liberated.

EXAMPLE 12

Example 11 was repeated using tetraethyl ammonium iodide ($8.45 \times 10^{-3}$ moles).

After 27 hours, the yield of tetraethyl ammonium amalgam was $1.47 \times 10^{-3}$ moles.

EXAMPLES 13–15

Examples 10 to 12 were repeated using dimethyl formamide as solvent. Yields of quaternary ammonium amalgam were comparable to the yields obtained with acetonitrile as solvent.

EXAMPLE 16

A saturated solution of methyltriethyl ammonium iodide in anhydrous acetonitrile was stirred over sodium amalgam (0.05% Na. wt./wt.) at a temperature of $-15°$ C., and the acetonitrile solution was analysed on a flame photometer for sodium. Comparison with standard solutions demonstrated a transfer of sodium ions into solution until saturation was reached, when sodium iodide precipitated.

In a control experiment using acetonitrile with no quaternary ammonium salt present, only minimal sodium transfer to the solvent was observed.

EXAMPLE 17

A solution of tetramethyl phosphonium iodide in anhydrous acetonitrile (100 ml. 0.02 M), dried by distillation from phosphorus pentoxide, was electrolysed at a temperature of $-30°$ C. for a period of 2 hours at a current density of 20 ma./sq. cm., using a cell divided by a glass frit and fitted with a mercury cathode and a platinum anode. Oxygen-free nitrogen was used to de-aerate the solution. Tetramethyl phosphonium amalgam was produced in the cathode compartment as a black amorphous powder on the mercury surface.

EXAMPLE 18

The procedure of Example 17 was repeated using a solution of tetrabutyl phosphonium iodide in anhydrous acetonitrile (0.02 M). Tetrabutyl phosphonium amalgam was formed as a black amorphous powder on the mercury surface.

EXAMPLE 19

The procedure of Example 17 was repeated using a solution of tetramethylene bis(tributyl phosphonium iodide) in anhydrous acetonitrile (0.02 M). Tetramethylene bis(tri-n-butyl phosphonium) amalgam was formed as a black amorphous powder on the mercury surface.

EXAMPLE 20

A solution of trimethyl sulphonium iodide in anhydrous dimethylformamide (0.06 M), dried by treatment with molecular sieve, was electrolysed at a temperature of 0° using a cell divided by a glass frit with a mercury cathode and a platinum anode, in an atmosphere of nitrogen. A voltage of 29 v. gave a current density of 2 ma./sq. cm. and trimethyl sulphonium amalgam was formed which was miscible with mercury.

EXAMPLE 21

A solution of tri-n-propyl sulphonium iodide in anhydrous acetonitrile (0.04 M), dried by distillation from phosphorus pentoxide was electrolysed at a mercury cathode at a temperature of 20°, using nitrogen to de-aerate the solution. A current density of 6 ma./sq. cm. gave tri-n-propyl sulphonium amalgam which formed in the cathode compartment.

EXAMPLE 22

A solution of triphenyl sulphonium bromide in acetonitrile (0.03 M), dried by distillation from phosphorus pentoxide, was electrolysed in an atmosphere of nitrogen at $-20°$ at a mercury cathode, using a current density of 1 ma./sq. cm. and an applied voltage of 17.5 v. The triphenyl sulphonium amalgam which was formed was miscible with mercury.

EXAMPLE 23

A solution of triethyl sulphonium iodide in anhydrous dimethylformamide was electrolysed under the conditions of Example 20. Triethyl sulphonium amalgam was detected in solution in the mercury by potential measurement.

EXAMPLE 24

A solution of tri-n-butyl sulphonium iodide in anhydrous dimethylformamide was electrolysed under the conditions of Example 20. Tri-n-butyl sulphonium amalgam was detected in solution in the mercury by potential measurement.

What we claim is:

1. As a composition of matter, an "onium" amalgam, which is the amalgam of the "onium" radical $R_nM$, where R is a hydrocarbyl group and M is selected from the group consisting of nitrogen, phosphorus and sulphur, and where $n$ is 4 when M is nitrogen or phosphorus and where $n$ is 3 when M is sulphur.

2. An "onium" amalgam as claimed in claim 1 in which M is nitrogen and $n=4$.

3. An "onium" amalgam as claimed in claim 2 in which $R_nM$ is tetramethyl, tetraethyl or tetra-n-propyl ammonium.

4. An "onium" amalgam as claimed in claim 2 in which $R_nM$ is trimethylethyl, methyltriethyl or cetyltrimethyl ammonium.

5. An "onium" amalgam as claimed in claim 2 in which $R_nM$ is dimethyl-diethyl, tetra-n-butyl or dodecyltrimethyl ammonium.

6. An "onium" amalgam as claimed in claim 1 in which M is phosphorus and $n=4$.

7. An "onium" amalgam as claimed in claim 6 in which $R_nM$ is tetramethyl or tetra-n-butyl phosphonium or tetramethylene bis(tri-n-butyl phosphonium).

8. An "onium" amalagam as claimed in claim 1 in which M is sulphur and $n=3$.

9. An "onium" amalgam as claimed in claim 8 in which $R_nM$ is trimethyl, triethyl, tri-n-propyl, tri-n-butyl or triphenyl sulphonium.

10. Process for preparing an "onium" amalgam according to claim 1 by reducing a solution of an "onium" salt at a mercury surface in a substantially inert polar aprotic medium at a temperature up to and including 10° C., and in the absence of gaseous oxygen.

11. Process according to claim 10 in which the reduction is carried out by reaction with an alkali metal amalgam.

12. Process according to claim 11 in which the alkali metal amalgam is sodium amalgam or potassium amalgam.

13. Process according to claim 10 in which the solvent is selected from acetonitrile, dimethylformamide, hexamethylphosphoramide, n-methyl pyrollidone or dimethyl sulphoxide.

14. Process according to claim 10 in which the "onium" salt contains a quaternary ammonium cation.

15. Process according to calim 10 in which the "onium" salt contains a quaternary phosphonium or ternary sulphonium cation.

16. Process according to claim 14 in which the quaternary; ammonium cation is selected from tetramethyl ammonium, trimethylethyl ammonium, dimethyldiethyl ammonium, methyltriethyl ammonium, tetraethyl ammonium, tetra-n-propyl ammonium, tetra-n-butyl ammonium, dodecyltrimethyl ammonium and cetyltrimethyl ammonium.

17. Process according to claim 15 in which the quaternary phosphonium or ternary sulphonium cation is selected from tetramethyl phosphonium, tetra-n-butyl phosphonium, tetramethylene bis(tri-n-butyl phosphonium) trimethyl sulphonium, triethyl sulphonium, tri-n-propyl sulphonium, tri-n-butyl sulphonium and triphenyl sulphonium.

18. Process according to claim 10 carried out in the absence of air and at a temperature between $-30°$ C. and $+10°$ C.

References Cited

UNITED STATES PATENTS

| | | | |
|---|---|---|---|
| 2,274,058 | 2/1942 | Goebel et al. | 260—431 XR |
| 2,942,018 | 6/1960 | Kobayashi et al. | 260—433 |
| 2,980,583 | 4/1961 | Tanner | 260—431 XR |
| 3,308,125 | 3/1967 | Wakeman et al. | 260—433 XR |
| 2,909,543 | 10/1959 | Wessner | 260—433 |

OTHER REFERENCES

Chemical Abstracts, vol. 14 (1920), p. 1323$^3$.
Chemical Abstracts, vol. 24 (1930), p. 4725$^4$.
Chemical Abstracts, vol. 25 (1931), p. 690$^2$.
Chemical Abstracts, vol. 56 (1962), p. 8284c.
Chemical Abstracts, vol. 58 (1963), p. 13286c.
Chemical Abstracts, vol. 63 (1965), p. 10802b.

TOBIAS E. LEVOW, Primary Examiner

H. M. S. SNEED, Assistant Examiner

U.S. Cl. X.R.

204—59; 260—433, 465.1